US005543781A

United States Patent [19]

Ganucheau, Jr. et al.

[11] Patent Number: 5,543,781

[45] Date of Patent: Aug. 6, 1996

[54] METHOD AND APPARATUS FOR USER SELECTABLE QUICK DATA ACCESS IN A SELECTIVE CALL RECEIVER

[75] Inventors: Charles J. Ganucheau, Jr., Boynton Beach, Fla.; Dean P. Vanden Heuvel, Chandler, Ariz.; Craig Halley; Kyung T. Mun, both of Mesa, Ariz.; Patrick L. Dumstorff, Bancroft, Iowa

[73] Assignee: Motorola, Inc., Schaumburg

[21] Appl. No.: 226,100

[22] Filed: Apr. 11, 1994

Related U.S. Application Data

[63] Continuation of Ser. No. 880,806, May 8, 1992, abandoned.

[51] Int. Cl.$^{6}$ .............................. G08B 5/22; H04Q 7/00

[52] U.S. Cl. .............................. 340/825.44; 340/825.27; 340/825.26; 364/710.04; 364/408

[58] Field of Search ........................ 340/825.44, 825.47, 340/825.26, 825.27, 311.1; 364/705.05, 705.06, 706, 709.04, 710.04, 408, 401; 379/355

[56] References Cited

U.S. PATENT DOCUMENTS

| | | | |
|---|---|---|---|
| 4,336,524 | 6/1982 | Levine | 340/825.44 |
| 4,473,824 | 9/1984 | Claytor | 340/825.27 |
| 4,845,491 | 7/1989 | Fascenda et al. | 340/825.44 |
| 4,872,005 | 10/1989 | DeLuca et al. | 340/825.44 |
| 4,951,039 | 8/1990 | Schwendeman et al. | 390/825.44 |
| 4,952,927 | 8/1990 | DeLuca et al. | 340/825.44 |
| 4,982,423 | 1/1991 | Muroi | 379/355 |
| 5,087,405 | 2/1992 | Kuramatsu et al. | 340/825.44 |
| 5,105,189 | 4/1992 | Murai et al. | 340/825.44 |

*Primary Examiner*—Donald J. Yusko
*Assistant Examiner*—Edward Merz
*Attorney, Agent, or Firm*—Kelly A. Gardner

[57] ABSTRACT

A selective call receiver (30) receives personal messages and information services provided database messages. A memory (44) stores the personal messages in a first portion (46) and the database messages as a plurality of screens in a second portion (48). A display (42) displays the plurality of screens for the user's perusal. To display a screen, the user can navigate through the plurality of screens manually through activation of user input controls (40) when operating in a database mode under the control of a controller (52). Alternatively, user selected screens can be directly accessed by placing operation of the receiver (30) under the control of a quick view controller (60) coupled to the database portion of memory (48) and the display (42). The quick view controller (60) allows manual selection of user selected screens or, in an automatic mode, sequentially displays the user selected screens. The quick view controller (60) also allows a user to display a flagged, user selected screen by providing for activation of a displayed icon representative of the displayed screen.

6 Claims, 6 Drawing Sheets

METHOD AND APPARATUS FOR USER SELECTABLE QUICK DATA ACCESS IN A SELECTIVE CALL RECEIVER

This is a File wrapper continuing application under 37 CFR 1.62, of prior application Ser. No. 07/880/806 filed on May 8 1992 by Ganucheau et al for "Method and Apparatus for User Selectable Quick Data Access In A Selective Call Receiver", now abandoned.

CROSS REFERENCE TO RELATED APPLICATION

A related application is patent application 08/226,098, now U.S. Pat. No. 5,426,422, filed concurrently herewith, by Dean P. Vanden Heuvel and Craig Halley, and assigned to the assignee hereof, entitled "Method and Apparatus for Quick Access to Selected Updated Information in a Selective Call Receiver".

FIELD OF THE INVENTION

This invention relates in general to selective call receivers, and in particular to selective call receivers for receiving information services.

BACKGROUND OF THE INVENTION

Selective call receivers are radio frequency receivers which selectively receive messages. Conventionally, a selective call receiver examines a selective call signal to determine whether the receiver has been addressed. When an address assigned to the receiver is detected, the selective call receiver decodes a selective call message. The user is alerted that a message has been received and the message can thereafter be presented, either as a voice message or a numeric or alphanumeric displayed message. The message may be displayed on a conventional display such as a liquid crystal display (LCD). It is desirable that selective call receivers be portable and, consequently, most selective call receivers have LCDs of limited size. Additionally, most selective call receivers have limited room for user input controls.

More recently, users of selective call receivers desire additional features, such as reception of information services, while maintaining the desire for small portable receivers. Information services are services which provide regularly updated messages, such as news services (UPI), financial services (Dow Jones Stock Reports), or sports services. One such information services selective call system is described in U.S. Pat. No. 4,845,491.

A user can subscribe to several information services and receive information on many topics. Each topic may consist of several screens (i.e. information capable of being displayed on the LCD at one time). To view a screen of information, the user manipulates the limited number of user input controls to reach the screen. This manipulation could consist of numerous activations of user controls. If the screen displays information of concern to the user, the user must either have the screen displayed continuously, thereby losing the ability to view the information of other screens, or continually activate the user controls a tedious number of times to navigate back and forth among the screens.

Thus, what is needed is a method and apparatus for selectively allowing a user quick access to a screen or screens of information on a regular basis.

SUMMARY OF THE INVENTION

A selective call receiver has a memory for storing a plurality of databases each having a plurality of screens of information included therein. The selective call receiver comprises memory selection means for flagging one of the plurality of screens responsive to a first user input. A receiver receives a selective call message subsequent to the flagging of the one of the plurality of screens, wherein the selective call message updates the information included in the flagged one of the plurality of screens. A display presents the information included in the flagged one of plurality of screens.

The selective call receiver further comprises mode selection means for receiving a second user input indicative of one of first, second, and third display modes and display activation means for activating the display means to display information included in the plurality of screens in response to manual actuations of the display activation means by the user.

Control means are employed for displaying, when the first display mode has been previously selected, the information included within the flagged one of the plurality of screens responsive to successive activations of the display activation means by the user to navigate through the one of the plurality of databases that includes the flagged one of the plurality of screens. The control means further displays, when the second display mode has been previously selected, the information included within the flagged one of the plurality of screens automatically and without user intervention. Additionally, the control means displays, when the third display mode has been previously selected, an icon representative of the flagged one of the plurality of screens such that the user can display the flagged one of the plurality of screens by activation of the display activation means to select the icon rather than by navigation through the database.

DETAILED DESCRIPTION OF THE INVENTION

Figure 1:
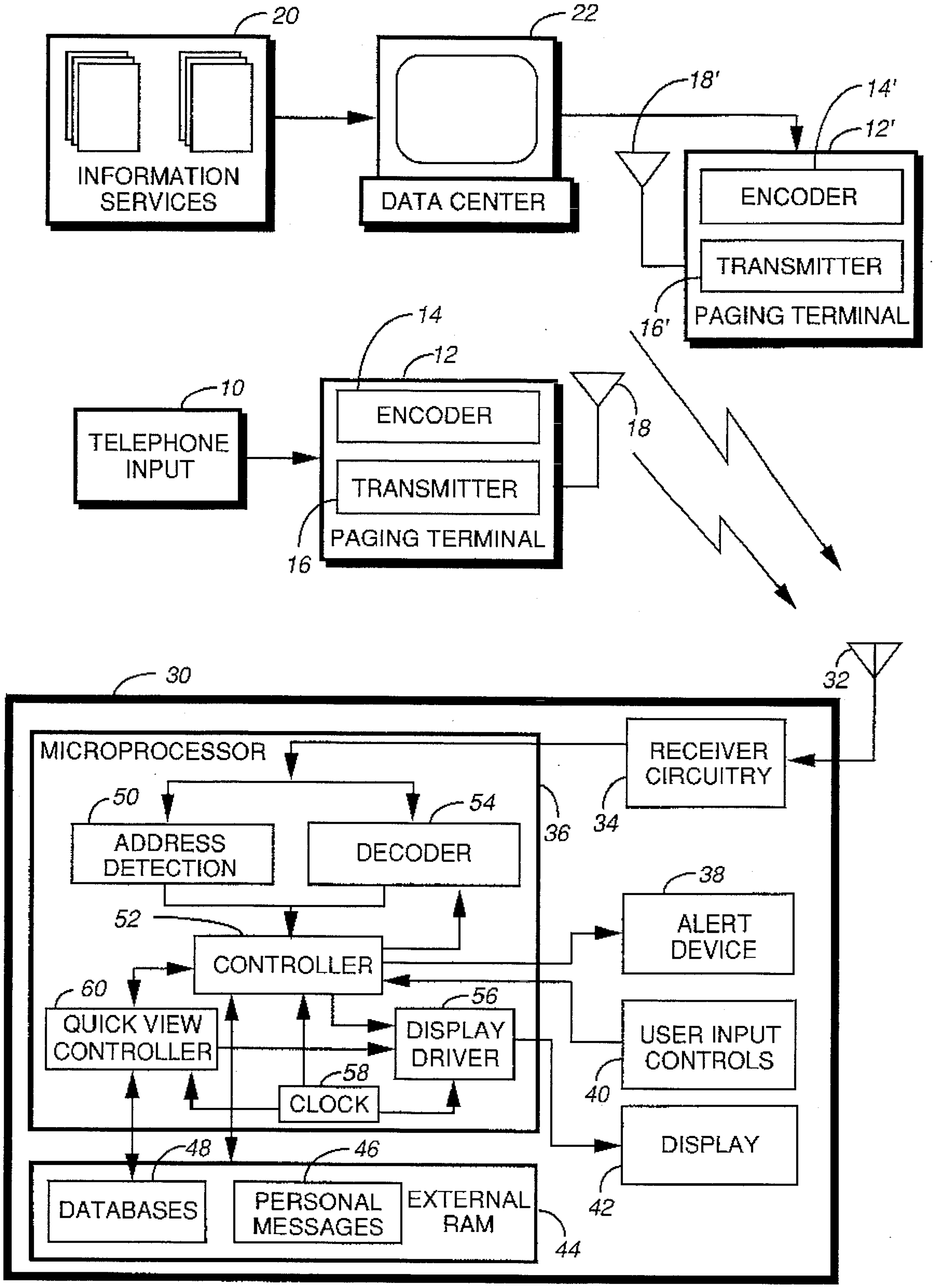
FIG. 1 is a block diagram of a selective call system in accordance with a preferred embodiment of the present invention.

Referring to FIG. 1, a selective call system in accordance with a preferred embodiment of the present invention transmits two types of signals: information services signals and personal message signals. As is well known to those skilled in the art, an originator of a personal selective call message inputs message information via a telephone input 10 to a paging terminal 12. The paging terminal 12 comprises an encoder 14 for encoding the message information into selective call signals and a transmitter 16 for broadcasting the selective call signals via an antenna 18.

Information services signals are derived from information services 20 which compile financial, sports, news, etc. information and forward the information to a data center 22. The data center 22 compiles the information provided by the information services 20 into appropriate messages which are provided through a paging terminal 12' for transmission as selective call signals therefrom. The paging terminal 12' similarly comprises an encoder 14', a transmitter 16', and an antenna 18'.

Thus, a selective call system in accordance with a preferred embodiment of the present invention broadcast signals comprising personal message selective call messages and information services selective call messages for reception by a receiver 30. The receiver 30 receives the selective call signals at the antenna 32 which generates electrical signals in response to the radio frequency information received and forwards the signals to receiver circuitry 34 for demodulation. The demodulated signal is provided to a microprocessor 36 for processing thereby. The microprocessor 36 is coupled to an alert device 38, user input controls 40, and a display 42 for interfacing with a user of the selective call receiver 30. Additionally, the microprocessor 36 is coupled to an external random access memory (RAM) 44 for storing information therein and for retrieving information therefrom.

In accordance with the preferred embodiment of the present invention, the external RAM 44 has designated areas for storing personal messages 46 and for storing information services databases 48. The databases are stored in a portion 48 of the external RAM 44 in a manner which allows a user to access the information services data stored therein.

When a selective call signal is received and demodulated by the receiver circuitry 34, an address detection block 50 of the microprocessor 36 examines the selective call signal to determine if an address assigned to the selective call receiver 30 is present within the signal. When an address assigned to the selective call receiver 30 is detected by the address detection block 50, a controller 52 is signaled to start a decoder block 54 decoding the received and demodulated selective call signal. The decoded signal is provided from the decoder block 54 to the controller 52 for processing thereby. The controller 52 stores the decoded selective call message in the appropriate portion 46, 48 of the external RAM 44. The controller 52 then provides a signal to the alert device 38 to alert the user that a selective call message has been received. Upon manipulation of the user input control 40 by the user, the controller 52 will provide the decoded selective call message to a display driver 56 for generation of a user readable display upon the display 42. A clock 58 is coupled to the controller 52 to provide conventional clocking functions allowing for proper operation of the controller 52 and the microprocessor 36.

The selective call receiver 30 will operate in three modes in accordance with the preferred embodiment of the present invention: a personal message mode, a database mode, and a quick view mode. When operating in the personal message mode, the selective call receiver can function as a conventional pager whereby the user can manipulate the user input controls 40 to select and read various personal messages stored in the personal message portion 48 of the RAM 44. During database mode operation, the user can manipulate the user input controls 40 to navigate through databases stored therein. Each database is comprised of a plurality of screens. A screen is a block of information which can be displayed at one time on a display 42. In the preferred embodiment of the present invention, the display 42 is a four line by twenty character liquid crystal display (LCD). A screen in accordance with the preferred embodiment therefore comprises eighty characters. A user may select and display various screens of the databases stored in the database portion 46 of the RAM 44.

In accordance with the preferred embodiment of the present invention, quick view mode operation is a mode of operation for allowing a user quick access to selected screens under the control of a quick view controller 60. The quick view controller 60 is coupled to the controller 52 for controlling the operation of the microprocessor 36 when the user places the selective call receiver 30 into the quick view operation mode. The quick view operation mode involves an automatic quick view mode wherein the quick view controller 60 automatically retrieves user selected screens from the database 48 and provides those screens sequentially to the display driver 56 for display upon the display 42. Also, a manual quick view mode allows a user to selectably retrieve previously selected screens from the memory 48 for display without the user having to navigate through a database to locate the screen. The clock 58 is coupled to the display driver 56 and the quick view controller 60 for controlling the amount of time that each of the user selective screens are displayed upon the display 42.

Figure 2:
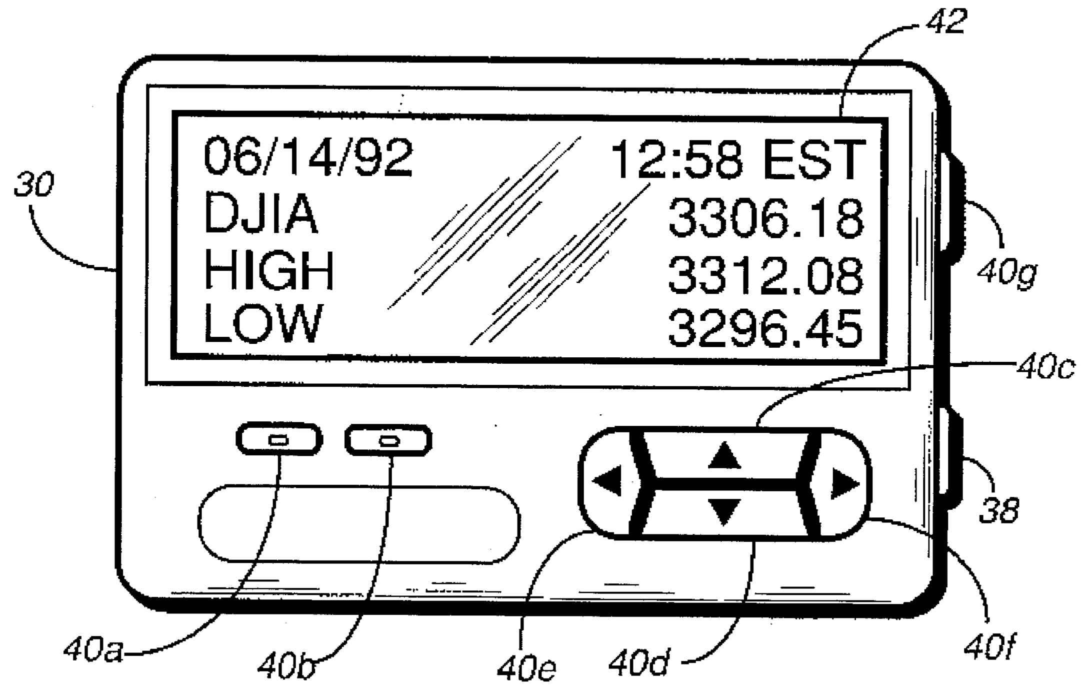
FIG. 2 is a planar view of the information services pager of FIG. 1 in accordance with the preferred embodiment of the present invention.

Referring next to FIG. 2, a preferred embodiment of the multi-function selective call receiver 30 of FIG. 1 is depicted. The user input controls 40 (FIG. 1) comprises a plurality of user activatable keys 40*a*, 40*b*, 40*c*, 40*d*, 40*e*, 40*f*, and 40*g*. The alert device 38 is a visual indicator such as a light emitting diode (LED) for alerting the user of the receiver 30. An audible annunciator could also be mounted just inside the housing of the receiver 30 to operate in conjunction with the LED 38 for alerting the user.

Figure 3:
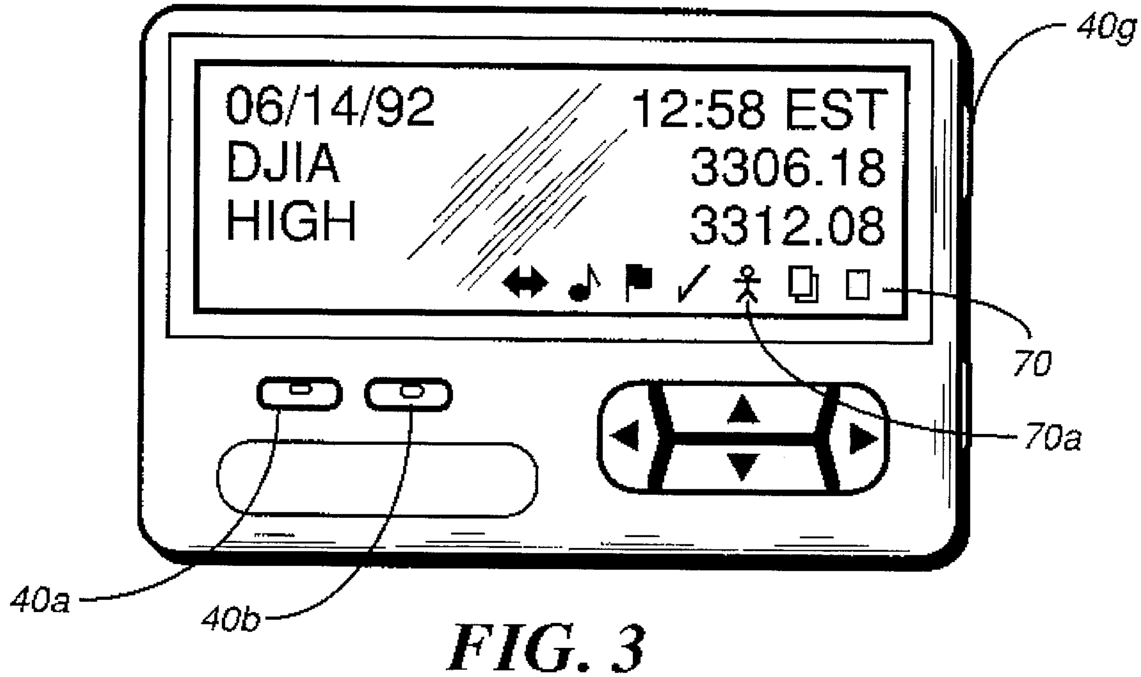
FIG. 3 is a planar view of the information services pager of FIG. 2 wherein a function menu overlays a screen of displayed information in accordance with the preferred embodiment of the present invention.

On the display 42 of FIG. 2, a typical database screen showing date information, time information, and financial stock information is shown. Upon activation of the function key 40*b*, the bottom line of the four line display 42 is overwritten, as shown in FIG. 3, with a function menu 70 showing a plurality of icons, each of the plurality of icons identifying a particular function. The left/right cursor keys 40*e*, 40*f* allow the user to scroll among the various functions of the function menu 70 and to select one of the icons therein. Upon selection of the proper icon e.g., 70*a*, the user depresses the function key 40*b* to activate that function. In accordance with the present invention, the user selects the man icon 70*a* to insert the selected screen into the list of selected screens for quick view mode of operation under the control of the quick view controller 60.

Figure 4:
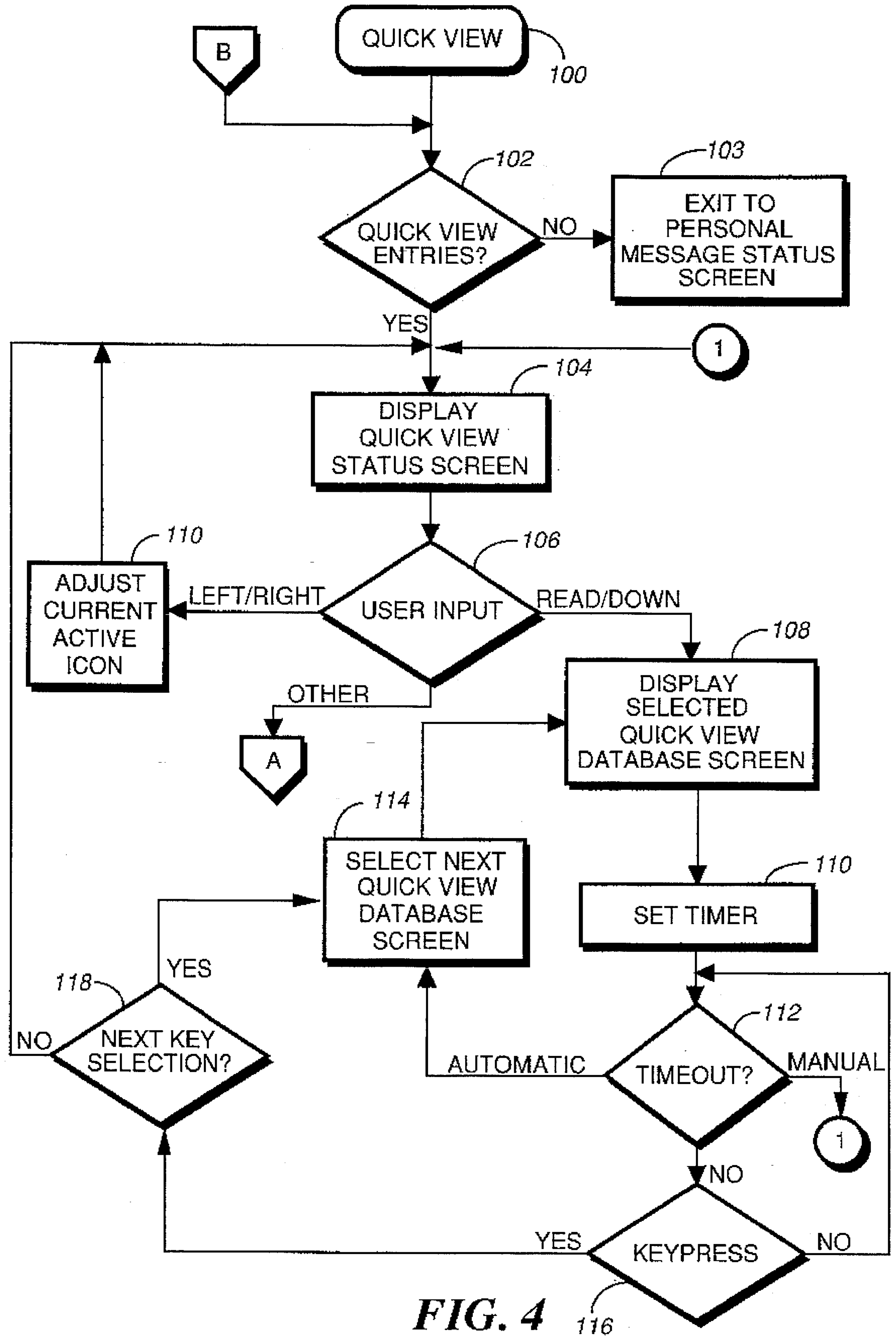
FIGS. 4 and 5 are a flow chart of operation of a quick view controller of the information services pager of FIG. 2 in accordance with the preferred embodiment of the present invention.

Referring to FIG. 4, the operation of the quick view controller 60 is shown as a quick view routine 100. Initially, it is determined 102 whether there are any entries (screens) assigned to quick view. If there are no screens for quick view operation 102 when the quick view mode is selected 100, the quick view controller 60 (FIG. 1) passes operation back to the controller 52 for display of the personal message status screen 103 and allows the user to select operations not essential to the present invention.

Figure 6:
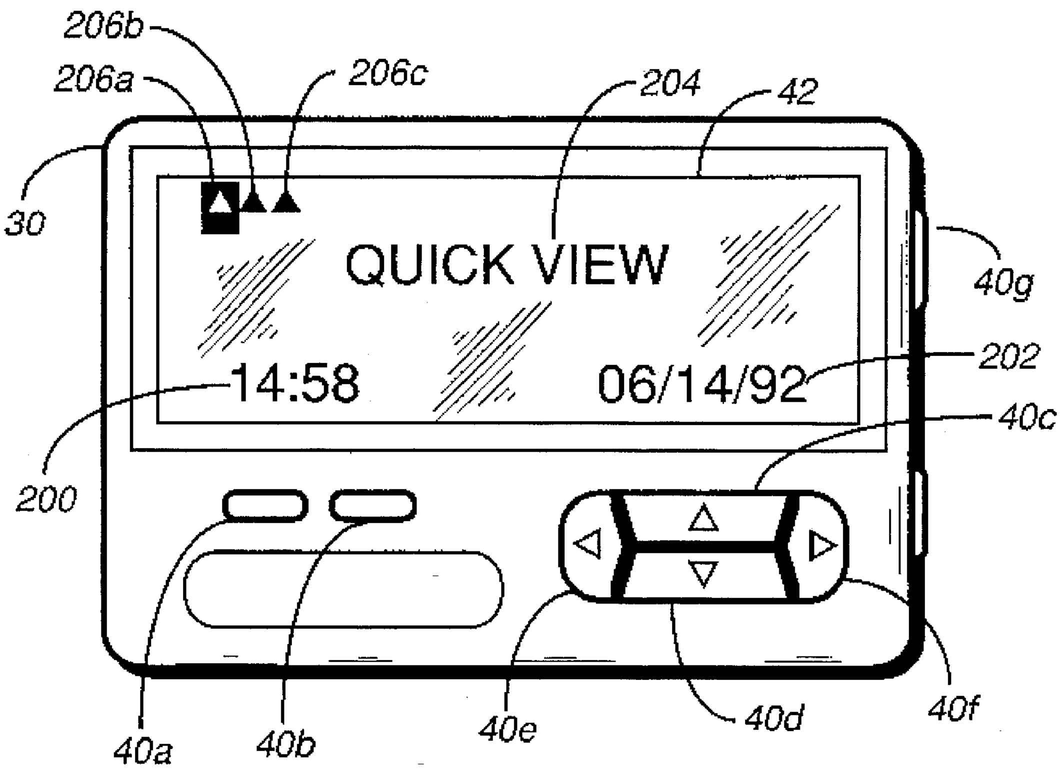
FIG. 6 is a planar view of the information services pager of FIG. 2 wherein the quick view status screen is displayed in accordance with the preferred embodiment of the present invention.

If there are quick view entries 102, then selection of the quick view mode 100 prompts display of a quick view status screen 104, as shown in FIG. 6. The quick view status screen (FIG. 6) comprises time information 200, date information 202, and a message indicating activation of quick view mode 204 which may be personalized by the service provider. Additionally, selectable screen icons 206*a*, 206*b* and 206*c* indicate that three screens have been preselected by the user for display during quick view operation.

The highlighting of icon 206*a* indicates that the left-most icon 206*a* is the current active icon. In accordance with the present invention, activation of the read key 40*a* or the down cursor key 40*d* as a user input 106 (FIG. 4) will cause display of the selected quick view database screen 108 in the manual quick view mode, which initially is the screen indicated by the current icon 206*a* (FIG. 6). Activation of the read key 40*a* will place the receiver in the automatic quick view mode, initially displaying the screen indicated by the current active icon 206*a*. To adjust the current active icon 109, the user activates the left cursor key 40*e* or the right cursor key 40*f* for movement left or right, respectively, among the screen indication icons 206*a*, 206*b* and 206*c*.

When the first selected quick view database screen is displayed 108, a timer is set 110 wherein the quick view controller 60 (FIG. 1), using signals from the clock 58, controls the time that the display driver 56 causes the selected screen to be displayed. The screen is displayed for a predetermined time, preferably user selectable. In manual quick view operation, when the timer times out 112, processing returns to display the quick view status screen (FIG. 6), and to await the next user input 106. In automatic quick view operation, if the timer times out 112, the quick view controller 60 (FIG. 1) automatically selects the next quick view database screen 114 by retrieving the screen from the database portion 48 of RAM 44 and providing it to the display driver 56 (FIG. 1). The display driver 56 causes the selected quick view screen to be displayed 108.

In either manual or automatic operation, if time out has not occurred 112, the user can override timer control by a key press 116 on any of the user input controls 40 (FIG. 6). For example, in accordance with the present invention, the user may not wish to view one of the quick view screens for the predetermined amount of time set by the timer 110. Therefore, an appropriate key press 116 such as activation of a key indicating selection of the next screen 118 would cause operation to proceed to retrieval of the next screen 114 earlier than timeout 112 of the predetermined time set in the timer 110. Any other key pressed would take operation out of the quick view database screen mode and return operation to display of the quick view status screen 104.

Figure 5:
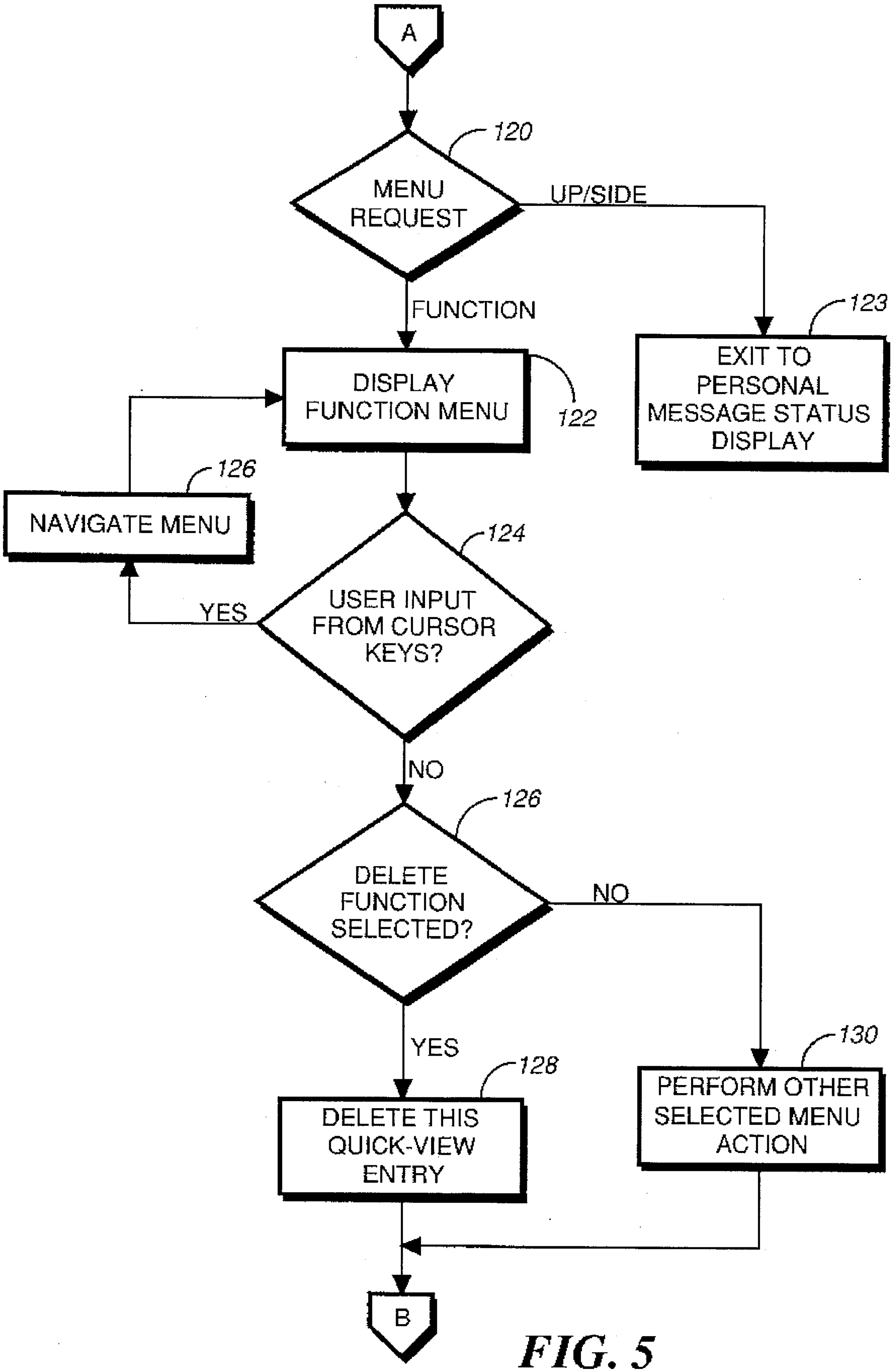

From the status screen 104, a user input 106 can request a quick view function menu 120 (FIG. 5). In accordance with the preferred embodiment of the present invention, a menu request 120 is performed by activation of the function key 40*b* (FIG. 6) which causes display of the function menu.

Figure 7:
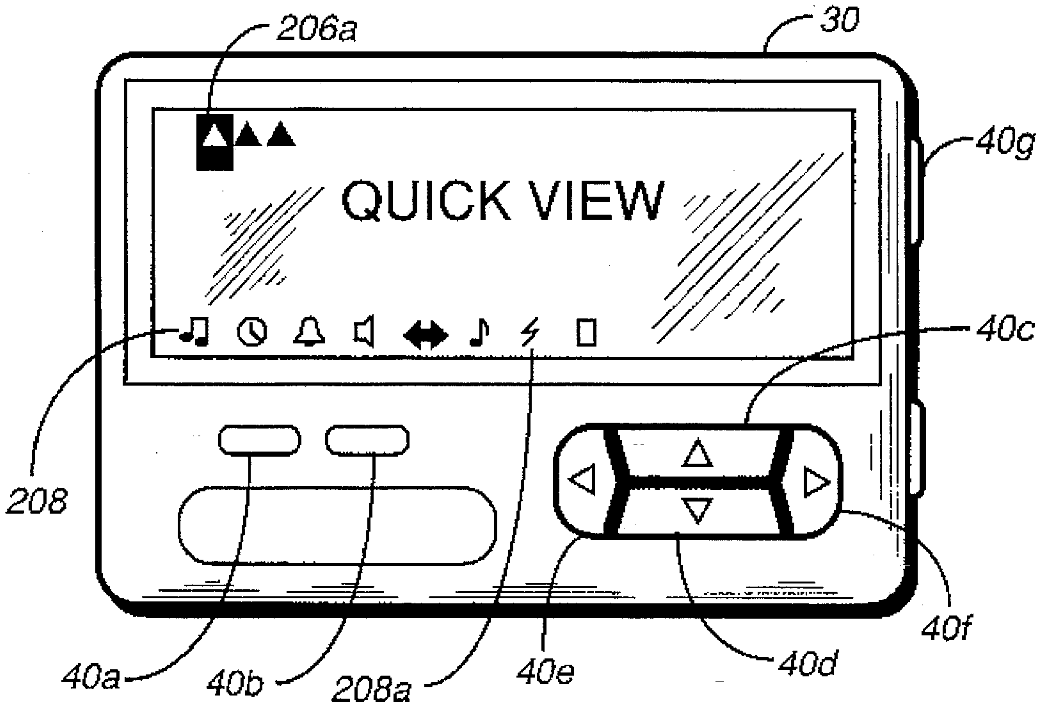
FIG. 7 is a planar view of the information services pager of FIG. 2 wherein the quick view status screen comprising a quick view function menu is displayed in accordance with the preferred embodiment of the present invention.

The quick view status screen function menu is shown in FIG. 7. The function menu 208 comprises a plurality of icons which can be utilized to select various quick view functions.

Referring back to FIG. 5, when the function menu is displayed 122 the quick view controller 60 (FIG. 1) looks for input from the left and right cursor keys 40*e* and 40*f*. The cursor keys can be used to navigate 126 the menu of functions 208 (FIG. 7) to allow the user to select a function. For example, if the user selects the delete function 126 as indicated by the lightning icon 208*a* (FIG. 7) the quick view entry (screen) indicated by the highlighted indicator icon 206*a* is removed 128 from quick view list of screens and operation proceeds back to the start of the quick view routine 100. If another function is selected 126, the action indicated by the menu icon selected is performed 130 and operation returns to the start of the quick view mode 100.

Thus, it can be seen that a selective call receiver operated in accordance with the present invention allows the user to view preselected quick view screens in order to keep apprised of various information services. A preferred embodiment of the present invention allows selection of twenty screens for quick view operation. When a user is not actively interacting with the multi-function selective call receiver 30, he can place the receiver into quick view mode operation and the quick view controller 60 will cause the display of various preselected screens of interest to the user. In automatic mode, these screens will be presented sequentially in a wrap-around manner such that sequential display of the screens will occur until the user makes an appropriate key press 116 (FIG. 4) to exit from quick view operation.

Figure 8:
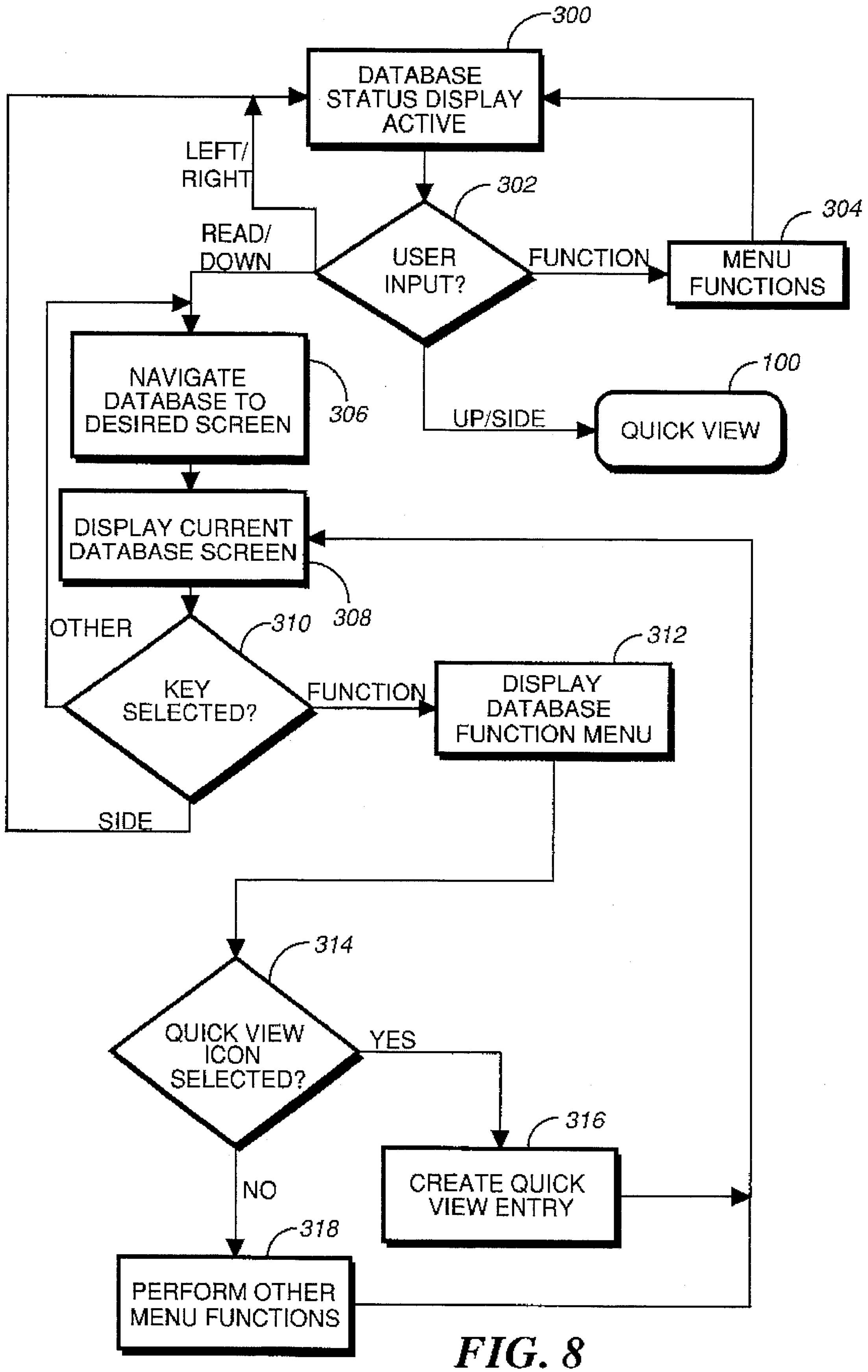
FIG. 8 is a flow chart of a quick view screen insertion operation of the information services pager of FIG. 2 in accordance with the preferred embodiment of the present invention.

Removal of screens from the quick view operation has been described 126, 128 (FIG. 5). Referring to FIG. 8, a flowchart of the operation of the insertion process whereby a database screen is selected for quick view operation is shown. Initially, operation of the selective call receiver 30 (FIG. 2) is in the database operation mode wherein a database status display is active 300. The database status display is similar to the quick view status display shown in FIG. 6 wherein the indicator icons 206 indicate the number of databases active and a message personalized by the service provider indicates that operation is in the database mode.

User input 302 initiates subsequent action. For example, the user may press a function key 40*b* (FIG. 7) and a menu of functions similar to that shown as menu 208 in FIG. 7 will be presented 304. Activation of the up cursor key 40*c* or the side key 40*g* will cause the selective call receiver 30 to move into the quick view operation mode 100 (FIGS. 4 and 5). Activation of the left or right movement keys 40*e*, 40*f*, respectively, allows the user to move the cursor left and right through the database indicators 206 to select a database for quick viewing.

In accordance with the present invention, activation of the down cursor key 40*d* or the read key 40*a* from the database status display 300 will allow the user to navigate 306 to a desired database screen. The current screen is displayed 308 and the user navigates through the database 306 by activation of the cursor keys 40*c*, 40*d*, 40*e*, and 40*f* until the desired screen is displayed 308. The function key 40*b* (FIG. 7) may be selected 310 to cause display of a database function menu as shown in FIG. 3. Or if the user has selected an undesired database screen, and it is displayed 308, the user may activate the side key 310 to return to the database status display 300. Activation of any other key 310 other than the side or function keys 40*g* or 40*d*, respectively, allows the user to navigate to a different database screen 306.

While the database function menu is displayed 312, the user may select any of the icons displayed by manipulation of the left and right cursor keys 40*e*, 40*f* and, when the appropriate icon is highlighted, activation of the function key 40*b*. If the quick view icon 70*a* (FIG. 3) is selected 314, a quick view entry of the currently displayed database screen is created 316 and operation returns to display the current database screen without the function menu 308. Otherwise, other menu functions may be performed 318 through appropriate selection of another function icon 70 (FIG. 3). After performing the menu functions 318, operation returns to display the current database screen 308.

By now it should be appreciated that there has been provided by the present invention a method and apparatus for selectively allowing a user to quickly view a screen or screens of information. The user can quickly access these screens by activating the quick view mode of operation which allow each of the preselected screens of information to be viewed on a regular basis. In accordance with the preferred embodiment of the present invention the user may select the amount of time that each of these screens would be displayed. Advantageously, since the quick view controller 60 (FIG. 1) retrieves each of the database screens from the database memory 48 as it provides them to the display driver 56 for display in the quick view mode, the information comprising the screen is current because updates occur to the information stored in the database portion 48 of the external RAM memory 44 as information service selective call messages are received. A preferred form of operation will allow the user to place the selective call receiver 30 in a charger upon his desk, enter the quick view mode, and for long periods of time view only that information of primary concern to the user. No manipulation of the user input controls 40 would be necessary unless the user wishes to view more than the selected screens.

What is claimed is:

1. A selective call receiver having a memory for storing a plurality of databases each having a plurality of screens of information included therein, the selective call receiver comprising:

memory selection means coupled to the memory for flagging one of the plurality of screens responsive to a first user input;

receiving means coupled to the memory for receiving a selective call message subsequent to the flagging of the one of the plurality of screens, wherein the selective call message updates the information included in the flagged one of the plurality of screens;

display means for displaying the information included in the flagged one of plurality of screens;

mode selection means coupled to the memory and the display means for receiving a second user input indicative of one of first, second, and third display modes;

display activation means coupled to the display means for activating the display means to display information included in the plurality of screens in response to manual actuations of the display activation means by the user;

control means coupled to the memory and the display means for displaying, when the first display mode has been previously selected, the information included within the flagged one of the plurality of screens responsive to successive activations of the display activation means by the user to navigate through the one of the plurality of databases that includes the flagged one of the plurality of screens, and for displaying, when the second display mode has been previously selected the information included within the flagged one of the plurality of screens automatically and without user intervention, and for automatically displaying, when the third display mode has been previously selected, an icon representative of the flagged one of the plurality of screens such that the user can display the flagged one of the plurality of screens by activation of the display activation means to select the icon rather than by navigation through the database.

2. The selective call receiver of claim 1 wherein the first display mode is a database display mode and the second display mode is an automatic quick view mode.

3. The selective call receiver of claim 1 wherein the memory selection means flags additional ones of the plurality of screens in response to further user inputs, and said control means comprises:

display driving means coupled to the display means for automatically displaying each of the flagged screens of the plurality of screens automatically and in succession when the control means is operating in the second display mode.

4. The selective call receiver of claim 1 wherein the third display mode is a manual quick view mode.

5. A selective call receiver having a memory for storing a plurality of databases each having a plurality of screens of information included therein, the selective call receiver comprising:

memory selection means coupled to the memory for flagging one of the plurality of screens responsive to a first user input;

receiving means coupled to the memory for receiving a selective call message subsequent to the flagging of the one of the plurality of screens, wherein the selective call message updates the information included in the flagged one of the plurality of screens;

display means for displaying data included in the plurality of databases;

display activation means coupled to the display means to display information included in the plurality of screens in response to manual actuations of the display activation means; and control means coupled to the memory and the display means for automatically displaying an icon representative of the flagged one of the plurality of screens such that the user can display the flagged one of the plurality of screens by activation of the display activation means to select the icon rather than by navigation through the database.

6. The selective call receiver of claim 5, further comprising:

mode selection means coupled to the control means and the memory for receiving a second user input indicative of a particular display mode in which the control means automatically displays the icon representative of the flagged one of the plurality of screens.

* * * * *